United States Patent
Di Iorio et al.

(10) Patent No.: US 8,889,313 B2
(45) Date of Patent: Nov. 18, 2014

(54) ELECTROLYTE PLATE WITH INCREASED RIGIDITY, AND ELECTROCHEMICAL SYSTEM COMPRISING SUCH AN ELECTROLYTE PLATE

(75) Inventors: Stephane Di Iorio, Lans-en-Vercors (FR); Thibaud Delahaye, Tresques (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 647 days.

(21) Appl. No.: 13/126,602

(22) PCT Filed: Oct. 28, 2009

(86) PCT No.: PCT/EP2009/064192
§ 371 (c)(1),
(2), (4) Date: Jun. 6, 2011

(87) PCT Pub. No.: WO2010/049441
PCT Pub. Date: May 6, 2010

(65) Prior Publication Data
US 2011/0229786 A1    Sep. 22, 2011

(30) Foreign Application Priority Data

Oct. 30, 2008    (FR) ..................... 08 57406

(51) Int. Cl.
*H01M 8/10* (2006.01)
*H01M 8/24* (2006.01)
*C25B 9/00* (2006.01)
*C25B 7/00* (2006.01)
*C25B 13/00* (2006.01)
*H01M 8/12* (2006.01)

(52) U.S. Cl.
CPC ........ *C25B 13/00* (2013.01); *H01M 2300/0077* (2013.01); *H01M 8/1253* (2013.01); *Y02E 60/525* (2013.01); *Y02E 60/521* (2013.01); *H01M 8/1006* (2013.01); *H01M 2008/1293* (2013.01); *H01M 8/122* (2013.01)
USPC ........... 429/452; 429/479; 429/495; 204/279; 204/267

(58) Field of Classification Search
USPC .................. 429/452, 479, 495; 204/279, 267
See application file for complete search history.

(56) References Cited

U.S. PATENT DOCUMENTS

| 7,045,237 B2 | 5/2006 | Sridhar et al. |
| 2002/0012825 A1 | 1/2002 | Sasahara et al. |

(Continued)

FOREIGN PATENT DOCUMENTS

| FR | 2 828 769 A1 | 2/2003 |
| FR | 2828769 A1 * | 2/2003 |

(Continued)

OTHER PUBLICATIONS

French Preliminary Search Report issued Feb. 24, 2009, in Patent Application No. 0857406.
U.S. Appl. No. 13/126,862, filed Jun. 29, 2011, Di Iorio, et al.

*Primary Examiner* — Karie O'Neill Apicella
(74) *Attorney, Agent, or Firm* — Oblon, Spivak, McClelland, Maier & Neustadt, L.L.P.

(57) ABSTRACT

An electrolyte plate for an electrochemical system including a first face and a second face, being opposite each other, of largest surface area, the first face including linear parallel ribs and the second face including linear parallel ribs. The plate thus exhibits an increased rigidity without substantially increasing the thickness thereof.

13 Claims, 4 Drawing Sheets

(56) References Cited

U.S. PATENT DOCUMENTS

| | | |
|---|---|---|
| 2003/0114297 A1* | 6/2003 | Shinn et al. .................. 502/159 |
| 2005/0238800 A1 | 10/2005 | Shinn et al. |
| 2006/0016685 A1 | 1/2006 | Hawkins et al. |

FOREIGN PATENT DOCUMENTS

| | | |
|---|---|---|
| JP | 7-161368 | 6/1995 |
| WO | WO 02/069413 A2 | 9/2002 |

\* cited by examiner

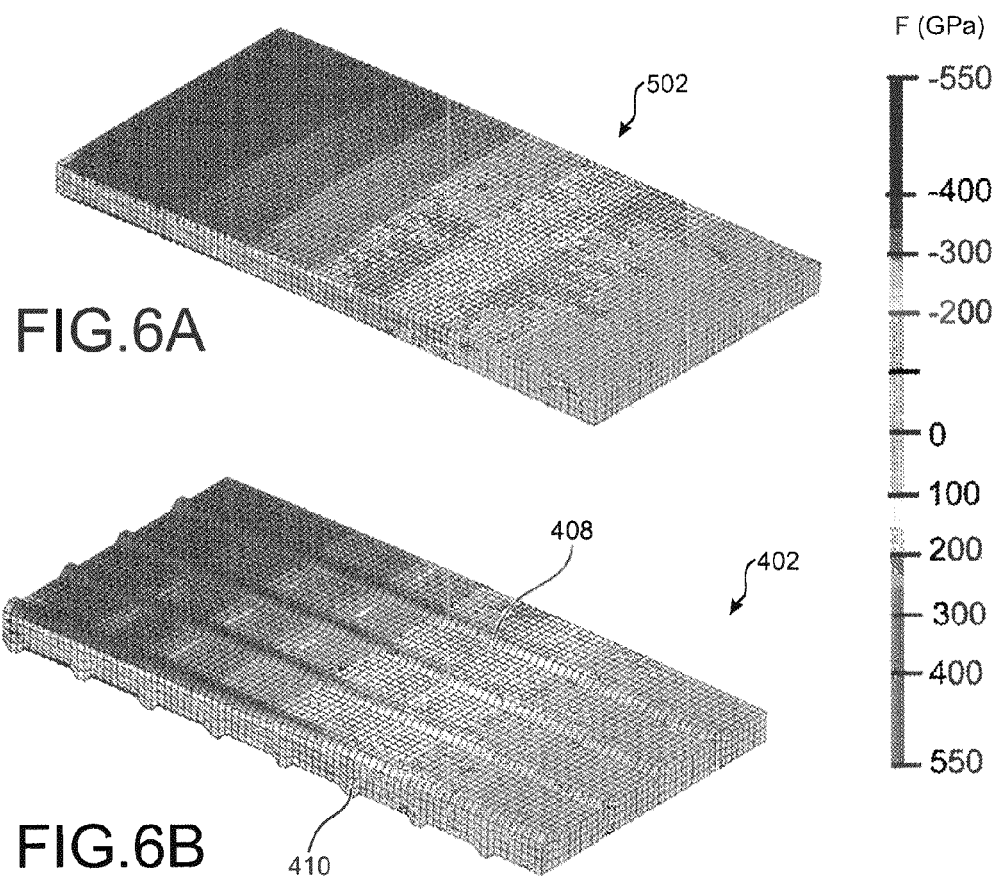
FIG.6A
FIG.6B
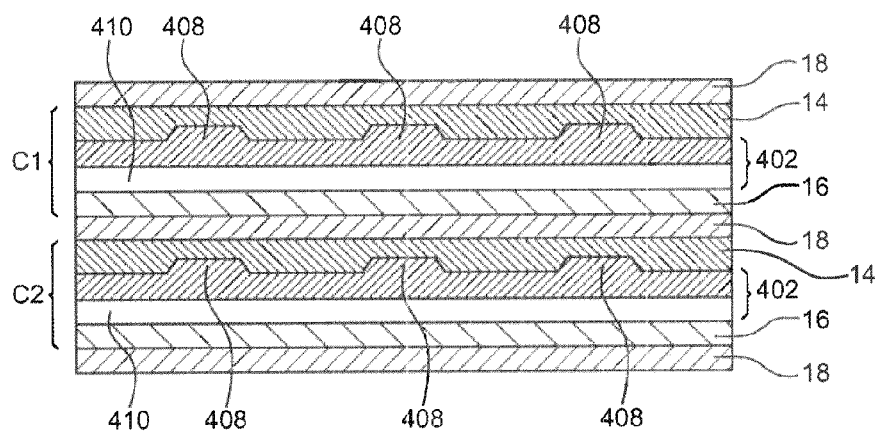
FIG.7

ELECTROLYTE PLATE WITH INCREASED RIGIDITY, AND ELECTROCHEMICAL SYSTEM COMPRISING SUCH AN ELECTROLYTE PLATE

TECHNICAL FIELD AND PRIOR ART

The present invention relates to an electrolyte plate with improved rigidity for fuel cells and for electrolysers, more particularly for high temperature, SOFC (solid oxide fuel cell) type fuel cells and for high temperature electrolysers (HTE).

An electrochemical system, such as a fuel cell or an electrolyser comprises a stack of cells, each cell comprising an anode, a cathode and a solid electrolyte, in the form of a plate, interposed between the anode and the cathode. The electrolyte is made of ceramic.

The lifetime of a high temperature fuel cell or a high temperature electrolyser is determined, especially, by the mechanical strength of each cell, and more particularly by the mechanical strength of the electrolyte in the case of cells with support electrolytes.

Yet, the cells are subject to mechanical loadings, during the manufacture and during the operation of the electrochemical system. In order to obtain good electrical contact between the different layers of the stack, a mechanical load is applied to the stack along its axis, during the assembly of the electrochemical system. This mechanical loading may be obtained by applying a predetermined force. This force is going to generate stresses and deformations in the system, and especially at the level of the cell. Too high stresses can bring about damage to the different layers, or even a rupture. Moreover, operation at high temperature puts a high strain on the different layers. The damage of different layers may reduce the performance of the electrochemical system, or even completely prevent its operation.

During damage with imposed force, a possible solution for reducing these risks of damage is to increase the thickness of the layers forming the cells, especially that of the electrolyte, which has the effect of reducing the stresses undergone by the cell. However an increase in thickness has for consequence a reduction in the electrochemical performance of the system.

The document U.S. Pat. No. 7,045,234 describes a ceramic electrolyte comprising bumps or points on the two faces thereof intended to receive electrodes. However these bumps or points have no effect on the rigidity of the electrolyte.

It is consequently an aim of the present invention to offer a solid electrolyte exhibiting an increased rigidity without any notable increase in the thickness thereof, or more generally to offer an electrochemical system with increased lifetime. Another aim of the invention is to promote a better mechanical adherence of the electrodes in contact with the electrolyte.

DESCRIPTION OF THE INVENTION

The aforementioned aim is attained by a ceramic electrolyte plate for fuel cell or electrolyser, of substantially flat shape comprising on its two faces protuberances in the form of straight or curved lines.

In other words, a plate is formed having on the two faces thereof of largest surface area a relief structured in lines, which makes it possible to increase considerably the rigidity of the electrolyte, and thus of the cell as a whole. Through an imposed force loading, this makes it possible to lower the stresses undergone by the cell, and if appropriate to control the distribution thereof. The lifetime of the electrochemical system composed of such cells is then increased.

In a particularly advantageous manner, the protuberances of one face are in the form of parallel straight lines, the protuberances of the other face are in the form of parallel straight lines, the direction of the protuberances of one face then forms an angle with the direction of the protuberances of the other face.

It is also advantageous to provide protuberances having a height greater than 2.5 µm.

The subject-matter of the present invention is thus an electrolyte plate for an electrochemical system comprising a first and a second face, facing each other, of largest surface area, each of these faces comprising ribs.

In an example of embodiment, the ribs of the first face are linear and substantially parallel and the ribs of the second face are linear and substantially parallel.

The ribs of the first face may be substantially parallel to the ribs of the second face.

Each rib of the second face may be contained in a plane orthogonal to the mean plane of the plate containing a rib of the first face.

In an advantageous example, the ribs of the first face are linear and form an angle with the ribs of the second face. Preferably, the angle between the ribs of the first face and the ribs of the second face is between 60° and 90°, and in an even more preferred manner is equal to 90°.

The distance separating the ribs is advantageously very large compared to the transversal dimension of the ribs, the ratio between said distance and the transversal dimension being for example between 1 and 33, and preferably between 2 and 5.

The ribs represent advantageously between 2% and 50% of the surface area of a face, more particularly the ribs represent between 15% and 25% of the surface area of a face.

The electrolyte plate according to the present invention may have a thickness e between 25 µm and 2 mm, advantageously equal to 200 µm, and ribs having a height between 5 µm and 1.5 mm, advantageously equal to 50 µm.

The subject-matter of the present invention is also an electrochemical system comprising at least one cell comprising an electrolyte plate according to the present invention, an anode on one of the first and the second faces and a cathode on the other of the faces thereof.

The electrochemical system may comprise a plurality of cells connected in series or in parallel by interconnecting plates arranged between an anode of one cell and a cathode of an adjacent cell.

The electrochemical system may be a fuel cell, for example high temperature, of SOFC type, or an electrolyser, for example high temperature.

BRIEF DESCRIPTION OF DRAWINGS

The present invention will be better understood by means of the description that follows and the appended drawings in which:

FIGS. 6A and 6B represent respectively the distribution of stresses on a plate without relief and on a plate of FIG. 6, FIG. 7 is a longitudinal sectional view of a fuel cell comprising electrolyte plates of FIG. 5.

DETAILED DESCRIPTION OF SPECIFIC EMBODIMENTS

The electrolyte plates that will be described have a parallelepiped rectangle shape, however it is clearly understood that plates having a disc shape or any other shape do not go beyond the scope of the present invention.

Figure 1:
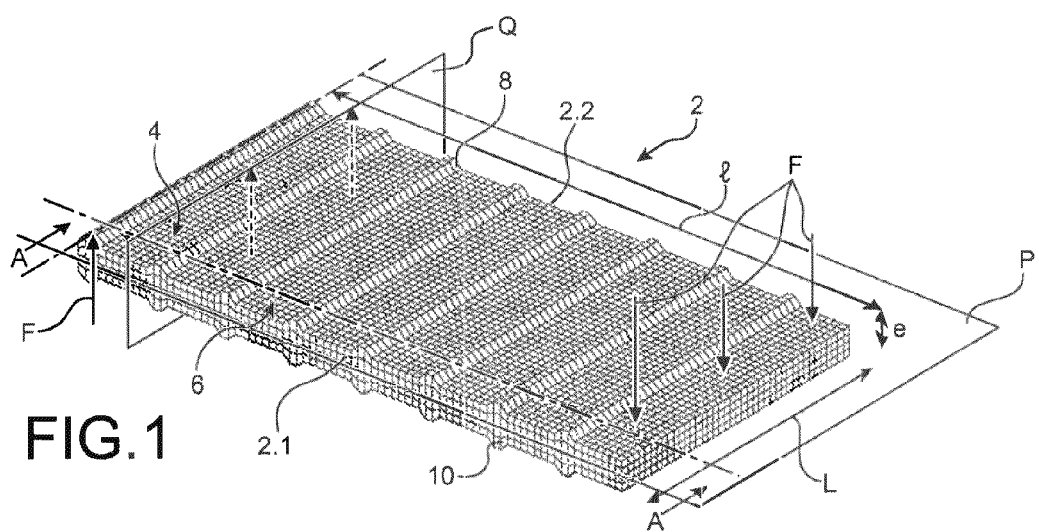
FIG. 1 is a perspective view of an example of embodiment of an electrolyte plate according to the present invention.

In FIG. 1 may be seen a first example of an electrolyte plate 2 according to the present invention, this has a substantially flat shape of mean plane P. The material of the electrolyte plate 2 is a ceramic.

The plate 2 has the shape of a parallelepiped rectangle having a low thickness compared to its width L and to its length 1.

The plate has two faces 4 and 6 of larger surface area, opposite in relation to the mean plane P.

These two faces 4, 6 are intended to be facing in one case an anode and in the other case a cathode, as may be seen in FIG. 7.

According to the present invention, each face 4, 6 comprises a relief spread out over its entire surface.

Figure 2:
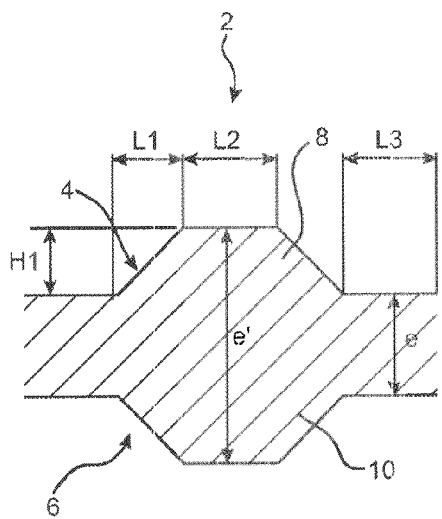
FIG. 2 is a sectional view along the plane A-A of the plate of FIG. 1.

In the example of FIG. 1, a sectional view of which along the plane A-A may be seen in FIG. 2, the relief is composed of linear ribs 8, 10 extending from an edge 2.1 of the plate to an opposite edge 2.2 of the plate. In this example, the ribs 4, 6 extend along the width.

In the present invention "ribs" is taken to mean lines forming protuberances on the faces of the electrolyte plate, the lines being able to be straight or curved. In the examples represented, the protruding lines are straight, but lines closed on themselves to form circles or broken lines forming zigzags do not go beyond the scope of the present invention.

In the example represented, the ribs 8, 10 of a same face 4, 6 are substantially parallel. However ribs of a face not parallel do not go beyond the scope of the present invention.

In the example of FIG. 1, the ribs 8 of the face 4 are parallel to the ribs 10 of the face 6, but this is in no way limiting, as will be seen in the remainder of the description.

Moreover, in this example, the ribs 8 of the face 4 form pairs with the ribs 10 of the face 6, each pair of ribs being contained in a plane Q orthogonal to the plane P. This lay out is also non limiting.

In FIG. 2 may be seen in detail a rib seen in transversal section. In the example represented, it has a section of isosceles trapezium shape, but it is clearly understood that a rib having any trapezoidal section, square section, rectangular or even half-circle does not go beyond the scope of the present invention.

The trapezoidal section has a height H1, a small base of length L2, a large base of length L2+2L1. Moreover, in the example represented, the ribs are spread out in a regular manner on the faces 4, 6. The distance separating two edges of adjacent ribs is L3 and is constant over the whole plate.

In this example of embodiment, the thickness of the electrolyte plate varies. Indeed it has a thickness e in the zones without rib and a thickness e' at the level of the ribs, e' being equal to e+2H1, the height of two ribs added to the thickness of the plate. It is then advantageous to have a very big dimension L3 compared to the other dimensions to reduce the electronic resistance of the plate.

In particular, according to the invention, it is advantageous that the ratio L3/(L2+2L1) is between 1 and 33, and preferably between 2 and 5.

Figure 3:
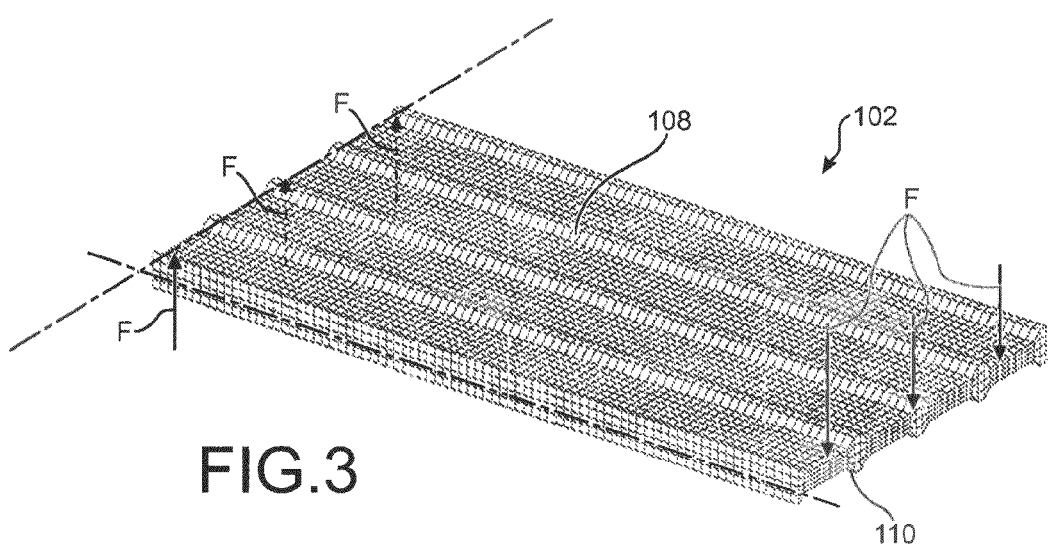
FIG. 3 is a perspective view of a variant of embodiment of an electrolyte plate of FIG. 1.

In FIG. 3, the plate 102 comprises ribs 108, 110 extending along the length of the plate and no longer along its width. The orientation of the ribs, along the length (FIG. 3) or along the width (FIG. 1) is chosen as a function of the type of strain applied, as will be seen hereafter.

The ribs, and more generally the reliefs on the two faces, have for effect of increasing in a significant manner the rigidity of the electrolyte plate without increasing in a significant manner the thickness of the plate, which would be damaging for the electronic resistance.

By way of illustration, in order to show the efficiency of the present invention, the apparent equivalent rigidities ($E_{equi}$) of plates having different configurations will be compared.

The rigidity of a material is characterised by the linear relation between the stress $\sigma$ applied and the elastic deformation $\epsilon$ resulting from this stress. The Young's modulus E corresponds to the slope of this straight line.

The following results have been obtained from a digital simulation of a three point bending test on plates having different configurations, which makes it possible to obtain the apparent Young's modulus or the apparent rigidity of plates in each of the configurations. The force is applied to the face 8. For the simulation, the forces are applied to the longitudinal ends of the plate and are symbolised by the arrows F in FIGS. 1 and 3.

A base plate of base having a thickness e=0.2 mm, a width L=2 mm and a length l=4 mm is considered. This plate has a Young's modulus or rigidity E=200 GPa, determined under the same simulation conditions.

TABLE I

Simulation results on a plate of FIG. 1.

| L1 (mm) | L2 (mm) | L3 (mm) | H1 (mm) | $E_{equi}$ (GPa) | Variation |
|---|---|---|---|---|---|
| 0.05 | 0.05 | 0.05 | 0.05 | 309.4 | 54.71% |
| 0.2 | 0.05 | 0.05 | 0.05 | 341.3 | 70.66% |
| 0.05 | 0.35 | 0.05 | 0.05 | 457.5 | 128.76% |
| 0.05 | 0.05 | 0.35 | 0.05 | 237.7 | 18.85% |

TABLE II

Simulation results on a plate of FIG. 3.

| L1 (mm) | L2 (mm) | L3 (mm) | H1 (mm) | $E_{equi}$ (GPa) | Variation |
|---|---|---|---|---|---|
| 0.05 | 0.05 | 0.05 | 0.05 | 412.6 | 106.28% |
| 0.2 | 0.05 | 0.05 | 0.05 | 404.4 | 102.20% |
| 0.05 | 0.35 | 0.05 | 0.05 | 559.8 | 179.89% |
| 0.05 | 0.05 | 0.35 | 0.05 | 284.6 | 42.28% |

The simulations, the results of which are gathered together in tables I and II above, were carried out on a plate, the section of which is similar to that of FIG. 1, the ribs having a height H1 equal to 0.05 mm. The final column groups together the ratio between the apparent rigidity of the plate modified according to the invention and the rigidity of a base plate (it will be recalled that it is equal to 200 GPa). Table I groups together the results on a plate, the ribs of which extend along the width (FIG. 1) and table II groups together the results on a plate, the ribs of which extend along the length (FIG. 3).

It will be noted that the apparent rigidity of the structured plates increases in a significant manner thanks to the presence of ribs. As has been seen previously, it is preferable, in this configuration, to have a considerable distance between the ribs. In the case where L3=0.35 mm (final line of each table), the apparent rigidity E increases by around 20% for ribs extending along the width and by around 40% for ribs extending along the length.

In the case of loading on the longitudinal ends symbolised by the arrows F, it appears that the arrangement of the ribs along the length of the plate is the most efficient.

The present invention thus makes it possible to form more rigid plates while limiting the thickness thereof.

Figure 4:
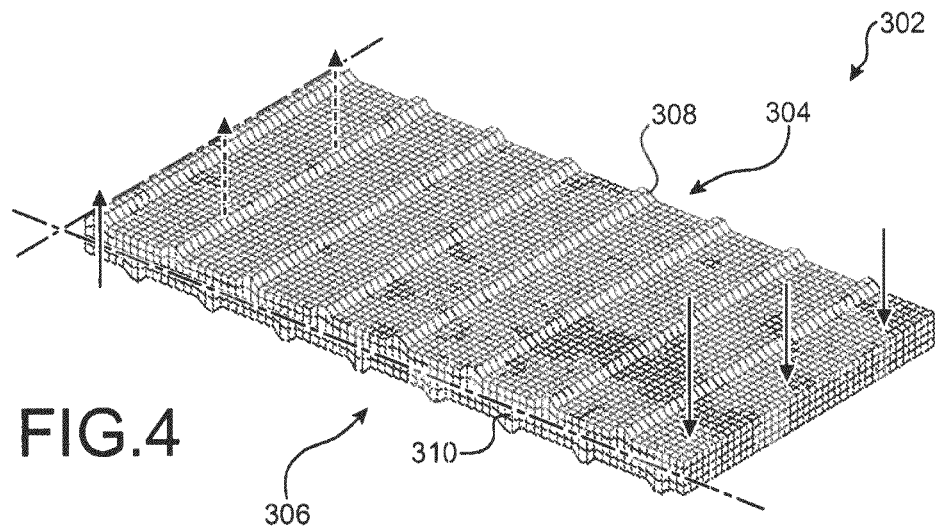
FIG. 4 is a perspective view of another variant of embodiment of an electrolyte plate of FIG. 1.

In FIG. 4 may be seen a plate 302 according to the invention, wherein the ribs 308, 310 of the two faces 304, 306 are no longer contained two by two in planes orthogonal to the mean plane of the plate, but the ribs 308 and the ribs 310 are offset in relation to each other, for example by a half-step.

This embodiment has the advantage of offering a reduced maximum thickness compared to the plate of FIG. 1. Indeed, in the case of FIG. 4, the maximum thickness is equal to e+H1, whereas in the case of FIG. 1, the maximum thickness is equal to e+2H1. The variation in the electronic resistance of the plate is then reduced.

Figure 5:
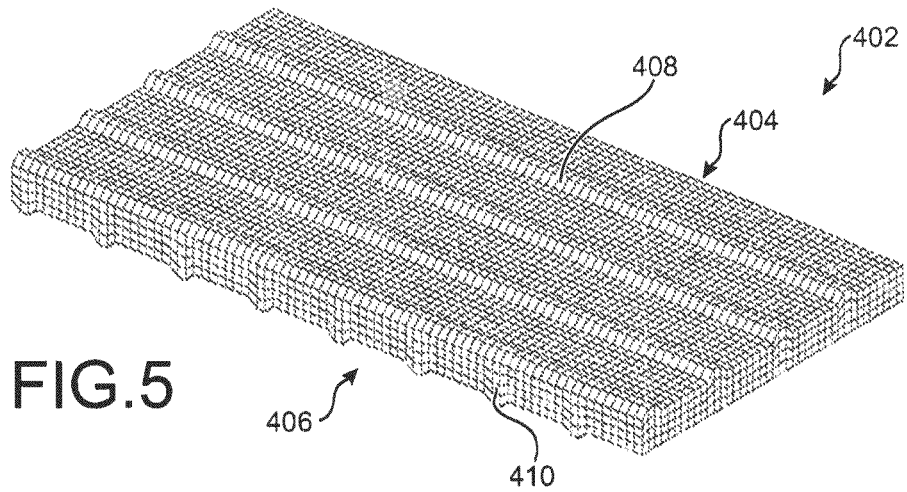
FIG. 5 is a perspective view of an example of a particularly advantageous embodiment of an electrolyte plate according to the present invention.

In FIG. 5 may be seen another example of embodiment of an electrolyte plate 402 according to the present invention, in which the ribs 408 situated on one face 404 do not have the same direction as the ribs 410 situated on the other face 410. The ribs 408 are substantially parallel, the ribs 410 are also substantially parallel, and the ribs 408 form an angle with the ribs 410.

The angle is advantageously between 60° and 90°, and is, in a preferred manner equal to 90°, as has been represented in FIG. 5 on which the ribs 408 and the ribs 410 form between them an angle of 90°, delineating a square mesh lattice design.

But it is clearly understood that ribs crossing each other at any angle lying in the interval [0; 90] does not go beyond the scope of the present invention. A lattice design with diamond shaped mesh or of parallelogram shape would then be defined.

In the example represented in FIG. 5, the ribs 408 of the upper face extend along the length and the ribs 410 of the lower face extend along the width. But it may be provided that the ribs 408 of the upper face extend along the width and the ribs 410 of the lower face extend along the length. These two configurations offer the same efficiency vis-á-vis the apparent rigidity whatever the type of loading, unlike the two configurations of FIGS. 2 and 3. This structure thus has the advantage of having a substantially equal rigidity in both directions, i.e. the direction of the length and the direction of the width.

It is recalled that a reference plate having a thickness e=0.2 mm, a width L=2 mm and a length l=4 mm, has a Young's modulus E=200 GPa. The stress is applied to the face 104.

A plate identical to that of FIG. 5, with ribs, the height of which is equal to 0.05 mm, exhibits a measured apparent rigidity equal to 258.1 GPa, which corresponds to a 29% increase in rigidity compared to that of the base plate defined above. In the case where the ribs 408 extend along the width, and the ribs 410 along the length, the measured apparent rigidity is equal to 264.5 GPa, which corresponds to an increase of 32%.

The crossed configuration of FIG. 5 has the advantage compared to the configurations of FIGS. 1 and 2 of exhibiting the same apparent rigidity as the strain, both in the direction of the width and in the direction of the length of the plate. In the case of a simultaneous strain in both directions, the plate deforms in a uniform manner, which limits the risks of damage.

Quite the reverse, the plates of FIGS. 1 and 2 exhibit different rigidities along the direction of strain.

For the same dimensions L1, L2 and L3, the crossed configuration of FIG. 5 offers an increased rigidity of 30% in both directions, compared to a plate with flat faces. Whereas the plate according to FIG. 1 exhibits an increase in rigidity of 19% for a strain in the direction of the length, and the plate according to FIG. 2 exhibits a 42% increase in the direction of the length. However, if these plates are strained along the width and no longer along the length, their apparent rigidity is going to vary: it is going to increase for the plate of FIG. 1 and decrease for the plate 2. Consequently, if the plates are strained in both directions simultaneously with a same force, the difference in rigidity is going to lead to non uniform deformation of the plate, which the plate according to the present invention makes possible to avoid.

In FIGS. 6A and 6B are represented the distributions of stresses within a plate of the prior art 502 and within a plate 402 of FIG. 5 according to the invention.

It will be noted that the maximum values of stresses are situated in the ribs 408. The volume of the overloaded parts is consequently low. The present invention thus makes it possible to be able to modify the distribution of stresses within a cell. In the example presented in FIG. 6B, the place of the maximum stresses is offset from the centre of the plate towards the ribs. As a function of the configuration, it is thus possible to increase the mechanical performance of a cell by adapting its shape to the envisaged loading.

By way of example, the following dimensions may be given:

The thickness e may be between 25 µm and 2 mm, and in a preferred manner may be equal to 200 µm; the height H1 of the ribs may be between 5 µm and 1.5 mm, and in a preferred manner may be equal to 50 µm; the dimension L1 may be between 10 µm and 1 mm, and in a preferred manner may be equal to 50 µm; the dimension L2 may be between 10 µm and 1 mm, and in a preferred manner may be equal to 350 µm; the dimension L3 may be between 10 µm and 1 mm, and in a preferred manner may be equal to 50 µm; it being understood that the variables L1, L2 and L3 preferably satisfy the relation:

$$1 < L3/(L2+2L1) < 33$$

An electrolyte plate may have the following external dimensions: in the case of a polygonal plate, it may be of square shape, the sides of which measure 150 mm. In the case of a plate of disc shape, it may be of a diameter equal to 120 mm.

A reinforcement density per $mm^2$ of between 2% and 50%, and preferentially between 15% and 25% is provided.

By way of example, the ceramic electrolyte plate may be made of yttrium stabilised zirconium, the oxygen electrode may be made of lanthanum chromite doped with strontium (LSM), and the H2 electrode may be a cermet of nickel/yttrium stabilised zirconium (Ni—YSZ).

The material of the electrolyte plate may also be 8YSZ, 3YSZ, 10ScSZ, 10Sc1CeSZ, 10Sc1ASZ, 10Sc1YSZ, 5YbSZ, BCY, BCZY, BCG, BZY, BCZG.

The design of the shape of the plate, especially the lay out, the distribution and the dimensions of the relief may be obtained by finite element calculation.

The electrolyte plate may be formed according to known techniques, for example by tape casting of a suspension of 3YSZ. The thickness of the plate before structuring takes account of the relief to be formed, for example the height of the ribs. The structuring of the faces of the plate is carried out "directly on the surface" (in other words before sintering), for example by means of a laser device, the movement of which may be programmed by means of a computer. The power of the beam must be sufficient to dig into the surface without breaking the cell. A first structuring is carried out on a first face, then the electrolyte plate is turned over to enable the structuring of the other face.

It is aimed to position very precisely the cell to obtain good structuring.

The following steps are those of a conventional method of forming a cell, especially the electrolyte plate is then sintered, then the electrodes are formed, for example by serigraphy, then sintered in their turn.

The invention thus does not imply an important modification of the method of manufacturing cells since it only necessitates the addition of a single step: structuring by laser beam.

The formation of crossed reliefs between the two faces of the plate makes it possible to improve the mechanical response without increasing the thickness of the material, the electronic resistance is then not increased. Moreover, this structuring makes it possible to control the place where the maximum stresses are going to appear.

Thanks to the present invention, the mechanical performance of a cell are increased without reducing the electrochemical performance thereof. Consequently, the formation of industrial fuel cells is facilitated because the core of the fuel cell is more efficient. The lifetime of fuel cells is thus increased since the mechanical loading on the core of the fuel cell is more adapted to what the cells can withstand. Moreover, the mechanical adherence of the electrolyte on the electrodes is favoured.

In FIG. 7 may be seen an example of SOFC fuel cell according to the present invention comprising a stack of cells C1, C2 each comprising a structured electrolyte plate similar to that of FIG. 5, an anode 14 and a cathode 16. The cells are connected in series by interconnecting plates 18.

The cells could also be connected in parallel.

An electrolyser according to the present invention is of similar design to that of the fuel cell of FIG. 7.

It is clearly understood that the ribs of a same face may not have the same dimensions, as well as from one face to the other.

A SOFC cell may be used for the cogeneration of electricity and heat with high energy efficiency. An electrolyser according to the invention may be used for the production of dihydrogen with good efficiency.

Plates in which the ribs do not extend over the whole surface of their faces also do not go beyond the scope of the present invention.

The invention claimed is:

1. An electrochemical system comprising:
   at least one cell comprising an electrolyte plate that includes: a first face and a second face, facing each other, each of these faces comprising ribs, wherein the ribs of the first face are linear in a direction parallel to the first and second face and protrude in a direction orthogonal to and away from the second face, the ribs of the second face are linear in a direction parallel to the first and second face and protrude in a direction orthogonal to and away from the first face, and the linear direction of the ribs of the first face form a non-zero degree angle with the linear direction of the ribs of the second face;
   an anode on one of the first and the second faces; and
   a cathode on the other of the faces thereof.

2. The electrochemical system according to claim 1, wherein the ribs of the first face are substantially parallel and the ribs of the second face are substantially parallel.

3. The electrochemical system according to claim 1, wherein the angle is between 60° and 90°.

4. The electrochemical system according to claim 1, wherein the angle is approximately equal to 90°.

5. The electrochemical system according to claim 1, wherein a distance separating the ribs is larger compared to a transversal dimension of the ribs, the ratio between the distance and the transversal dimension being between 1 and 33.

6. The electrochemical system according to claim 1, wherein the ribs represent between 2% and 50% of the surface area of a face.

7. The electrochemical system according to claim 1, the electrolyte plate having a thickness between 25 μm and 2 mm, or equal to 200 μm, and wherein the ribs have a height between 5 μm and 1.5 mm, or equal to 50 μm.

8. An electrochemical system according to claim 1, comprising a plurality of cells connected in series or in parallel by interconnecting plates arranged between an anode of a cell and a cathode of an adjacent cell.

9. An electrochemical system according to claim 1, the electrochemical system being a fuel cell, a fuel cell of high temperature, or a SOFC fuel cell.

10. The electrochemical system according to claim 1, the electrochemical system being an electrolyser, or a high temperature electrolyser.

11. The electrochemical system according to claim 1, wherein a distance separating the ribs is larger compared to a transversal dimension of the ribs, the ratio between the distance and the transversal dimension being between 2 and 5.

12. The electrochemical system according to claim 1, wherein the ribs represent between 15% and 25% of the surface area of a face.

13. The electrochemical system according to claim 1, the electrolyte plate having a thickness equal to 200 μm, and wherein the ribs have a height equal to 50 μm.

* * * * *